United States Patent
Skala

(10) Patent No.: US 8,974,976 B2
(45) Date of Patent: Mar. 10, 2015

(54) METHOD OF HUMIDIFYING FUEL CELL INLETS USING WICK-BASED WATER TRAP HUMIDIFIERS

(75) Inventor: Glenn W. Skala, Churchville, NY (US)

(73) Assignee: GM Global Technology Operations LLC, Detroit, MI (US)

(*) Notice: Subject to any disclaimer, the term of this patent is extended or adjusted under 35 U.S.C. 154(b) by 2535 days.

(21) Appl. No.: 11/669,922

(22) Filed: Jan. 31, 2007

(65) Prior Publication Data

US 2008/0182148 A1 Jul. 31, 2008

(51) Int. Cl.
*H01M 8/04* (2006.01)
*H01M 8/24* (2006.01)
*H01M 8/10* (2006.01)

(52) U.S. Cl.
CPC .......... *H01M 8/249* (2013.01); *H01M 8/04089* (2013.01); *H01M 8/04126* (2013.01); *H01M 8/04149* (2013.01); *H01M 8/04492* (2013.01); *H01M 2008/1095* (2013.01); *Y02E 60/50* (2013.01)
USPC ....................................................... 429/413

(58) Field of Classification Search
CPC .................... H01M 8/04149; H01M 8/04126; H01M 8/04492
USPC ......................................................... 429/413
See application file for complete search history.

(56) References Cited

U.S. PATENT DOCUMENTS

| | | | |
|---|---|---|---|
| 6,066,408 A * | 5/2000 | Vitale et al. | 429/413 |
| 6,846,587 B2 * | 1/2005 | Yang | 429/415 |
| 7,087,333 B2 * | 8/2006 | Schafer | 429/444 |
| 7,192,668 B2 | 3/2007 | Dehne | |
| 2002/0182456 A1 * | 12/2002 | Condit et al. | 429/13 |
| 2004/0166384 A1 * | 8/2004 | Schafer | 429/17 |
| 2005/0147853 A1 | 7/2005 | Kaufmann et al. | |
| 2006/0008695 A1 * | 1/2006 | Bai et al. | 429/38 |
| 2006/0088743 A1 * | 4/2006 | Gallagher et al. | 429/13 |
| 2007/0287036 A1 * | 12/2007 | Kondo et al. | 429/13 |
| 2008/0014472 A1 | 1/2008 | Logan | |

FOREIGN PATENT DOCUMENTS

DE 10 2004 008 704 A1 9/2004
WO WO 03/005472 A2 1/2003

* cited by examiner

*Primary Examiner* — Milton I Cano
*Assistant Examiner* — Stephen Yanchuk
(74) *Attorney, Agent, or Firm* — John A. Miller; Miller IP Group, PLC

(57) ABSTRACT

A fuel cell system that employs a split fuel cell stack, where fresh anode gas is humidified by water trap humidifiers. The fuel cell system includes a plurality of valves that are opened and closed to provide stack order switching between the split stacks so that the flow of hydrogen through the stacks is always in the same direction. A water trap humidifier is provided at the anode inlet to both split stacks, possibly in the anode inlet manifold or fuel cell non-active region, to provide the humidification. The valves are selectively opened and closed to provide fresh hydrogen to one stack, and humidified hydrogen to the other stack.

32 Claims, 3 Drawing Sheets

METHOD OF HUMIDIFYING FUEL CELL INLETS USING WICK-BASED WATER TRAP HUMIDIFIERS

BACKGROUND OF THE INVENTION

1. Field of the Invention

This invention relates generally to a system for humidifying a reactant gas being sent to a fuel cell stack and, more particularly, to a system for humidifying hydrogen being sent to the anode side of a split fuel cell stack, where the system employs stack order switching or anode exhaust gas recirculation and the hydrogen is humidified by a wick-based water trap.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

For automotive applications, it typically takes about 400 fuel cells to provide the desired power. Because so many fuel cells are required for the stack in automotive fuel cell system designs, the stack is sometimes split into two sub-stacks each including about 200 fuel cells because it is difficult to effectively provide an equal flow of hydrogen gas through so many fuel cells in parallel.

The membranes within a fuel cell need to have a certain relative humidity so that the ionic resistance across the membrane is low enough to effectively conduct protons. This humidification may come from the stack water by-product or external humidification. The flow of hydrogen through the anode gas flow channels has a drying effect on the membrane, most noticeably at an inlet of the hydrogen flow. Also, the accumulation of water droplets within the anode gas flow channels from the membrane relative humidity and water by-product could prevent hydrogen from flowing therethrough, and cause the cell to fail because of low reactant gas flow, thus affecting the stack stability. The accumulation of water in the reactant gas flow channels is particularly troublesome at low stack output power.

It has been proposed in the art to provide stack order switching in a fuel cell system that employs split stacks. Particularly, suitable valves and plumbing in the system are provided so that the anode exhaust gas exiting a first sub-stack is sent to the anode input of a second sub-stack, and the anode exhaust gas exiting the second sub-stack is sent to the anode input of the first sub-stack in a cyclical manner. In this known design, the fresh hydrogen being applied to the first sub-stack in the sequence is dry, and has a tendency to dry the membranes at the inlet, which could cause the stability problems discussed above.

It is desirable that the distribution of hydrogen within the anode flow channels in a fuel cell stack be substantially constant for proper fuel cell stack operation. Therefore, it is known in the art to input more hydrogen into the fuel cell stack than is necessary for a certain output load of the stack so that the anode gas is evenly distributed. However, because of this requirement, the amount of hydrogen in the anode exhaust gas is significant, and would lead to low system efficiency if that hydrogen were discarded. Further, hydrogen gas in a sufficient quantity discharged to the environment could cause certain problems because of the explosive nature of hydrogen. Therefore, it is known in the art to recirculated the anode exhaust gas back to the anode input to reuse the discarded hydrogen.

SUMMARY OF THE INVENTION

In accordance with the teachings of the present invention, a fuel cell system is disclosed that employs a split fuel cell stack, where fresh anode gas is humidified by water trap humidifiers. The fuel cell system includes a plurality of valves that are opened and closed to provide stack order switching between the split stacks so that the flow of hydrogen through the stacks is always in the same direction. A water trap humidifier is provided at the anode inlet to both split stacks, possibly in the anode inlet manifold or fuel cell non-active region, to provide the humidification. When the valves are selectively opened and closed to provide fresh hydrogen to a first stack, the humidified anode gas from the output of the first stack is used to wetten the water trap humidifier at the input to the second stack in the sequence. When the order of the stacks is switched, and the fresh dry hydrogen is being provided to the second stack in the sequence, the wettened water trap humidifier at the input to the second stack is used to humidify the fresh hydrogen, and the humidified anode gas from the output of the second stack is used to wetten the watertrap humidifier at the input to the first stack.

In an alternate embodiment, the fuel cell system employs anode exhaust gas recirculation, where the anode exhaust gas is recirculated back to the anode input. In this design, the system includes a water trap humidifier that absorbs water when the relative humidity of the anode exhaust gas is high, and provides water to the anode recirculation gas when the relative humidity of the anode exhaust gas is low. In one particular design, the watertrap humidifier is upstream of a recirculation pump.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system employing stack order shifting or anode exhaust gas recirculation and anode inlet gas humidification is merely exemplary in nature, and is in no way intended to limit the invention or its applications or uses.

Figure 1:
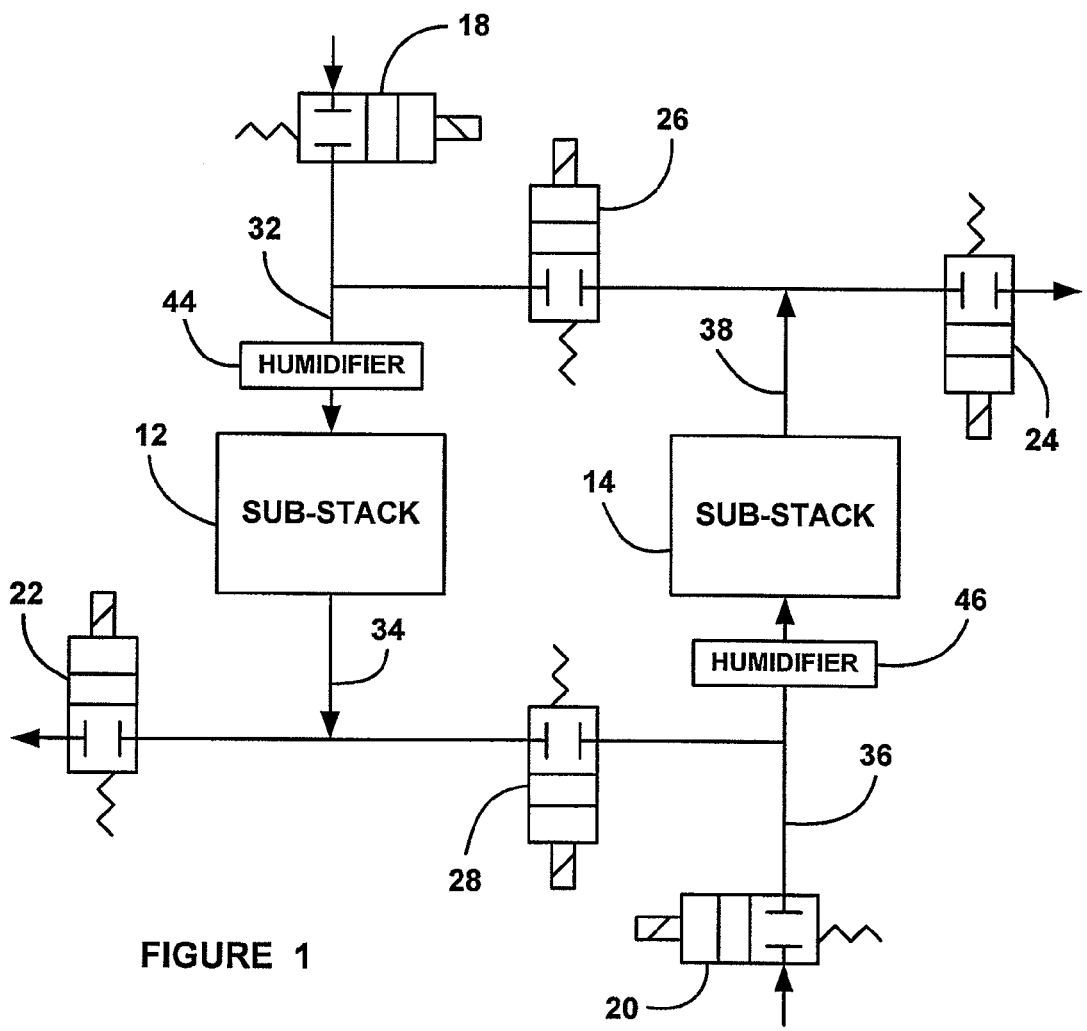
FIG. 1 is a schematic diagram of a fuel cell stack that employs stack order switching, where a water trap humidifier is provided at the anode input to both sub-stacks, according to an embodiment of the present invention.

FIG. 1 is a schematic diagram of a fuel cell system 10 including a first sub-stack 12 and a second sub-stack 14. As will be discussed in more detail below, the system 10 employs stack order switching where the flow of the anode gas is always in the same direction through the sub-stacks 12 and 14, but is switched as to which stack receives the fresh hydrogen. The system 10 includes a first input control valve 18 at the anode input of the sub-stack 12 and a second input control valve 20 at the anode input of the sub-stack 14. A first bleed valve 22 is provided at the anode output of the sub-stack 12 and a second bleed valve 24 is provided at the anode output of the sub-stack 14. A control valve 26 is provided between the anode output of the sub-stack 14 and the anode input of the sub-stack 12, and a control valve 28 is provided between the anode output of the sub-stack 12 and the anode input of the sub-stack 14.

As mentioned above, the order of which sub-stack 12 or 14 receives the fresh hydrogen is switched at a predetermined duty cycle. Particularly, during one cycle, the valves 18, 28 and 24 are opened, and the valves 20, 26 and 22 are closed. In this configuration, fresh hydrogen is sent to the sub-stack 12 on line 32 through the control valve 18. Anode exhaust gas exits the sub-stack 12 on line 34, flows through the control valve 28 and enters the anode input of the sub-stack 14 on line 36. The anode exhaust gas from the sub-stack 14 can then be bled from the system 10 through the bleed valve 24. In this orientation, fresh dry hydrogen is applied to the sub-stack 12 at a cathode stoichiometry greater than two, and humidified hydrogen at the output of the sub-stack 12 will be input to the sub-stack 14 at a cathode stoichiometry of about one.

When the stack order is switched, the valves 18, 28 and 24 are closed and the valves 20, 26 and 22 are opened. Fresh hydrogen is sent to the anode input of the sub-stack 14 through the control valve 20, exits the sub-stack 14 on line 38, goes into the anode input of the sub-stack 12 through the control valve 26 and the line 32, and exits the sub-stack 12 on line 34 to be bled through the bleed valve 22. In this orientation, fresh dry hydrogen is applied to the sub-stack 14 and humidified hydrogen on the line 38 is applied to the sub-stack 12. In an alternate embodiment, the control valves 26 and 28 can be replaced with passive check valves. Stack order switching as discussed above at an appropriate duty cycle is well known to those skilled in the art.

According to the invention, a first water trap humidifier 44 is provided in the line 32 at the input of the sub-stack 12 and a second water trap humidifier 46 is provided in the line 36 at the input of the sub-stack 14. Therefore, when the fresh hydrogen is being provided to the sub-stack 12 on the line 32, and humidified hydrogen is being provided to the sub-stack 14 on the line 36, the humidifier 44 is humidifying the dry hydrogen and the humidifier 46 is absorbing water from the humidified hydrogen at the output of the sub-stack 12 on the line 34. Likewise, when the fresh hydrogen is being provided to the sub-stack 14, and humidified hydrogen is being provided to the sub-stack 12 on the line 32, the humidifier 46 is humidifying the dry hydrogen and the humidifier 44 is absorbing water from the humidified hydrogen at the output of the sub-stack 14 on the line 38. Therefore, as the order of the sub-stacks 12 and 14 is switched back and forth, one of the humidifiers 44 and 46 will be getting wet to provide humidification for the next cycle and one of the humidifiers that was made wet from the previous cycle will be humidifying the fresh hydrogen.

By providing the humidifiers 44 and 46 before the anode inlets of the sub-stacks 12 and 14, respectively, liquid water droplets that may be in the anode exhaust gas from the other sub-stack are absorbed by the humidifiers 44 and 46, and would not enter the anode reactant gas flow channels, which could possibly cause cell stability problems.

Figure 2:
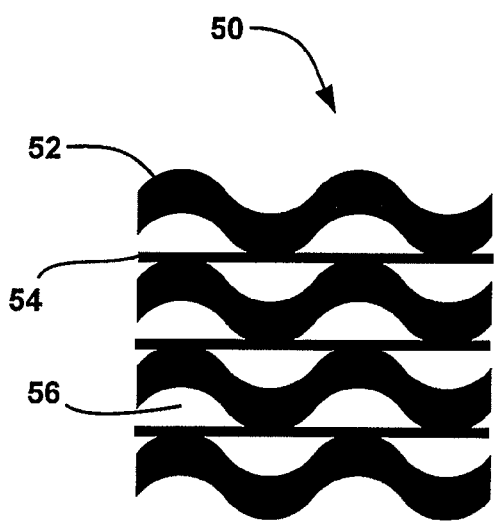
FIG. 2 is a cross-sectional view of a portion of one of the water trap humidifiers shown in the system in FIG. 1.

The humidifiers 44 and 46 can be any suitable humidifier for the purposes described herein. In one embodiment, the humidifiers 44 and 46 are wick-based water traps that use a wicking material to absorb water than can then be used to humidify a gas flow. FIG. 2 is a cross-sectional view of a portion of a wick-based water trap 50 suitable for this purpose that can be used for the humidifiers 44 and 46. The water trap 50 includes a plurality of corrugated walls 52 separated by plates 54, where the walls 52 and the plates 54 are made of a suitable hydrophilic porous material that absorbs water. The reactant gas flows down channels 56 between the corrugated walls 52 and the plates 54 where it absorbs water vapor therefrom. Water would wick readily into the corrugated walls 52 during a wet flow, and evaporate from the surfaces during a dry hydrogen flow. The size and number of corrugations and the length of the corrugations could be varied depending on the water trapping/evaporating needs and/or the pressure drop requirements. The thickness of the corrugated walls 52 could also be tailored for the same reasons.

Figure 3:
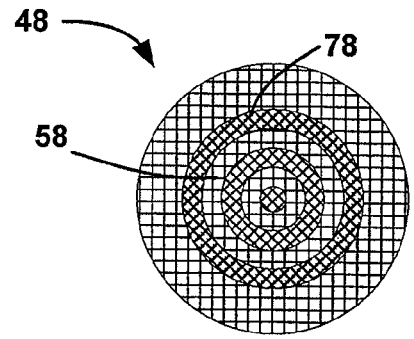
FIG. 3 is a cross-sectional end view of a water trap humidifier, according to another embodiment of the present invention.

The wick-based water trap design is applicable to a planar design or a spiral wound design. The spiral wound design could be inserted into a cylindrical pipe similar to the plumbing that brings the hydrogen flow into the anode side of a fuel cell stack. It is also conceivable that cylindrical or rectangular geometries could be extruded from an appropriate extrudable porous hydrophilic material. FIG. 3 is an end view of a water trap humidifier 48 including channels 58 and water absorbing walls 78 therebetween showing this type of design. The wet gas would flow down the channels 58 to allow the wall 78 to absorb the moisture and the dry gas to be humidified would then flow down the flow channels 58 to absorb water from the humidified walls 78.

The humidifiers 44 and 46 are shown at the inlet side of the sub-stacks 12 and 14, respectively. In an alternate embodiment, the humidifiers 44 and 46 can be provided inside the sub-stacks 12 and 14, either in the inlet manifold on the anode side or within the non-active region of the fuel cells themselves before the active area of the fuel cells, depending on the particular stack design. By putting the humidifiers 44 and 46 within the sub-stacks 12 and 14, respectively, the absorption of liquid water from the humidified hydrogen may be increased as a result of the increase in heat provided by the operation of the sub-stacks 12 and 14.

Figure 4:
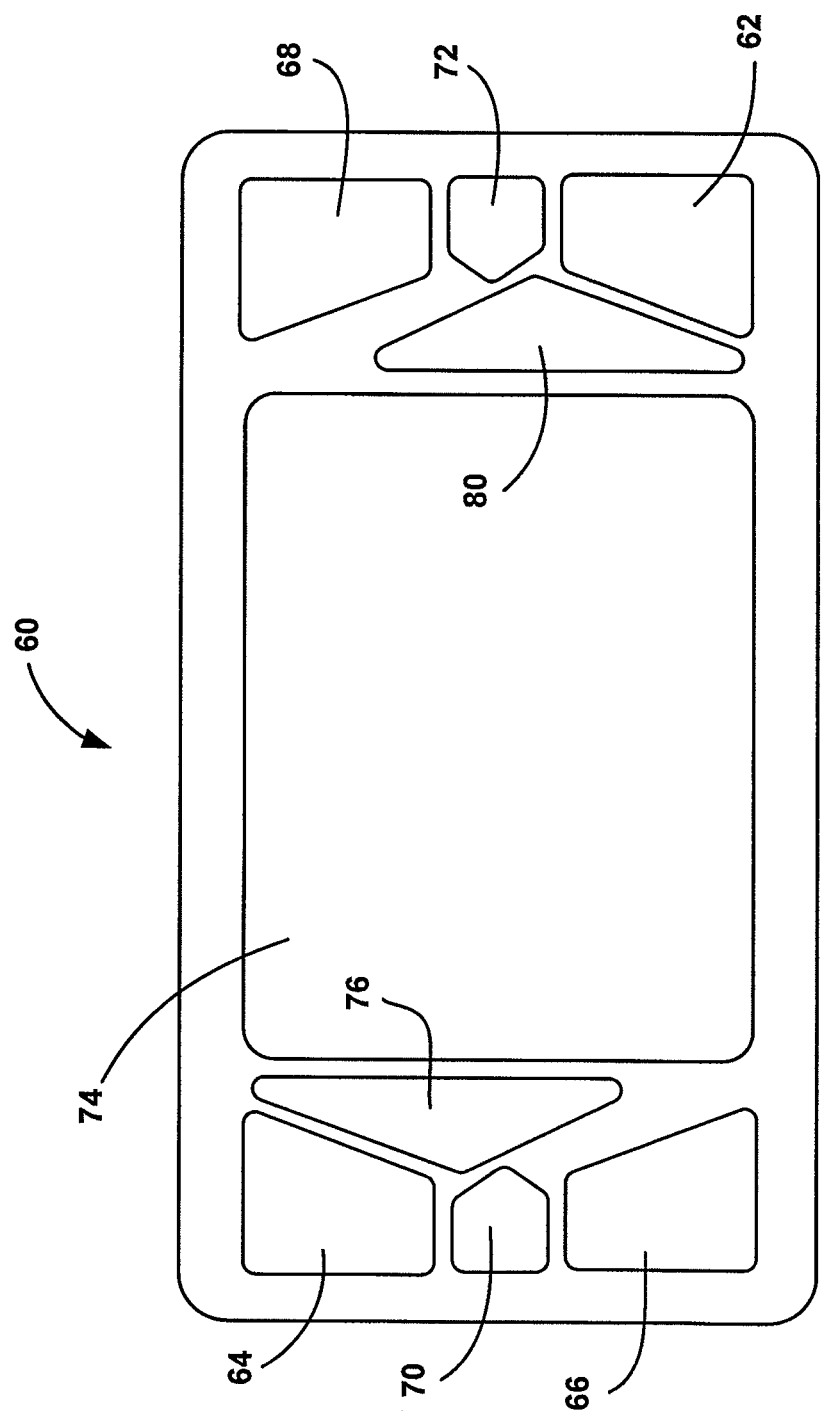
FIG. 4 is a cross-sectional view of a fuel cell stack showing a wick-based humidifier in a non-active region of a fuel cell in the stack at the anode inlet.

FIG. 4 is a cross-sectional view of a fuel cell stack 60 showing this embodiment of the invention. The fuel cell stack 60 includes an anode inlet manifold 62, an anode outlet manifold 64, a cathode inlet manifold 66, a cathode outlet manifold 68, a coolant inlet manifold 70, a coolant outlet manifold 72 and a fuel cell active area 74. In this design, non-active fuel regions 76 are provided between the manifolds and the fuel cell active area 74. By placing a wick-based humidifier 80 in the non-active region proximate the anode inlet manifold 62, the fresh hydrogen can be humidified before reaching the fuel cell active area 74, and the humidifier 80 can absorb water in the manner as discussed above.

In this embodiment, the humidifier 80 would be warmed by the stack coolant flow through the coolant outlet manifold 72, thus providing heat for vaporization. This, in turn, would reduce the amount of heat rejected to the radiator (not shown) in the thermal sub-system, reducing the size of the radiator. For example, to evaporate sufficient water to humidify the anode flow of a 110 kW fuel cell stack to a relative humidity of 40% at 80° C. requires about 11 kW of heat. If the heat is not provided, the wick-based humidifier would cool, reducing its ability to evaporate more water, thus reducing the level of humidification. These values are for a steady state condition, where further analysis would be necessary to understand the absorption of water in the cycling mode.

The discussion above concerns humidifying fresh hydrogen in a stack switching design. In another embodiment, the same principle of humidifying fresh hydrogen applied to the anode side of the fuel cell stack can be provided for an anode flow shifting design where the flow of the hydrogen reactant gas is reversed between the split stacks in a cyclical manner. One design for anode flow shifting includes two stacks having anode channels connected in series, where the anode flow is cycled back and forth through the stacks resulting in alternating cathode stoichiometry of two and a cathode stoichiometry of one in the two stacks. When the flow is in the reverse mode where it is exiting the reactant inlet of a downstream stack, it would include some liquid water which could be come trapped in a watertrap humidifier. Conversely, in the forward flow mode, the fresh hydrogen supply is flowing over the water trap humidifier and into the now upstream stack where it would be humidified prior to entering the anode of the stack.

The discussion above also concerns humidifying the anode gas for the anode side of the fuel cell stack. However, it is also necessary to humidify the cathode air flow to the cathode side of the stack in similar flow design. Therefore, a wick-based water trap humidifier can also be at or near the cathode inlet to split stacks either employing stack switching or reverse flow for the same purpose.

A water trap humidifier buffer of the type discussed above could be effectively used in a fuel cell system that employed anode exhaust gas recycling. While anode exhaust gas recycling could be done in a split stack design, it is generally more practical to apply it to a non-split design. Anode exhaust gas recycling is used to maintain uniform anode gas distribution and provide a technique for clearing liquid water from the anode flow channels at low power conditions, i.e., low inlet hydrogen flows.

It has been discovered that fuel cell systems that employ anode exhaust gas recycling see intermittent two phase flow in the anode recycling loop. It has also been discovered that condensing conditions that may occur upstream can allow the two phase flow to exist down stream even though the local water to air ratio would be sub-saturated under equilibrium conditions. This is due to the inability of the liquid water to reevaporate in the short time it has traveled from upstream to downstream.

At the same time, one location of a gas carrying portion of a fuel cell system can swing from sub-saturated to oversaturated conditions due to temperature and/or pressure swings. This can happen during power transients, ambient air pressure changes, coolant temperature control variations or during cold system starts.

The liquid water in the recycled anode exhaust gas flow can cause problems in the recycle pumping device and/or fuel cell stack either in a liquid form or under freeze conditions. Inserting a wick-based water trap humidifier upstream of the recycled pump device would intercept the water droplets in the anode recycle stream during wet operating conditions and then provide high surface areas for evaporation of the trapped water during dry operating conditions. As in other embodiments, the wick-based water trap humidifier could be a discrete device before the anode recycle pumping device or integrated into the cell design, preferably in the anode exit region for the case of anode exhaust gas recycling.

Figure 5:
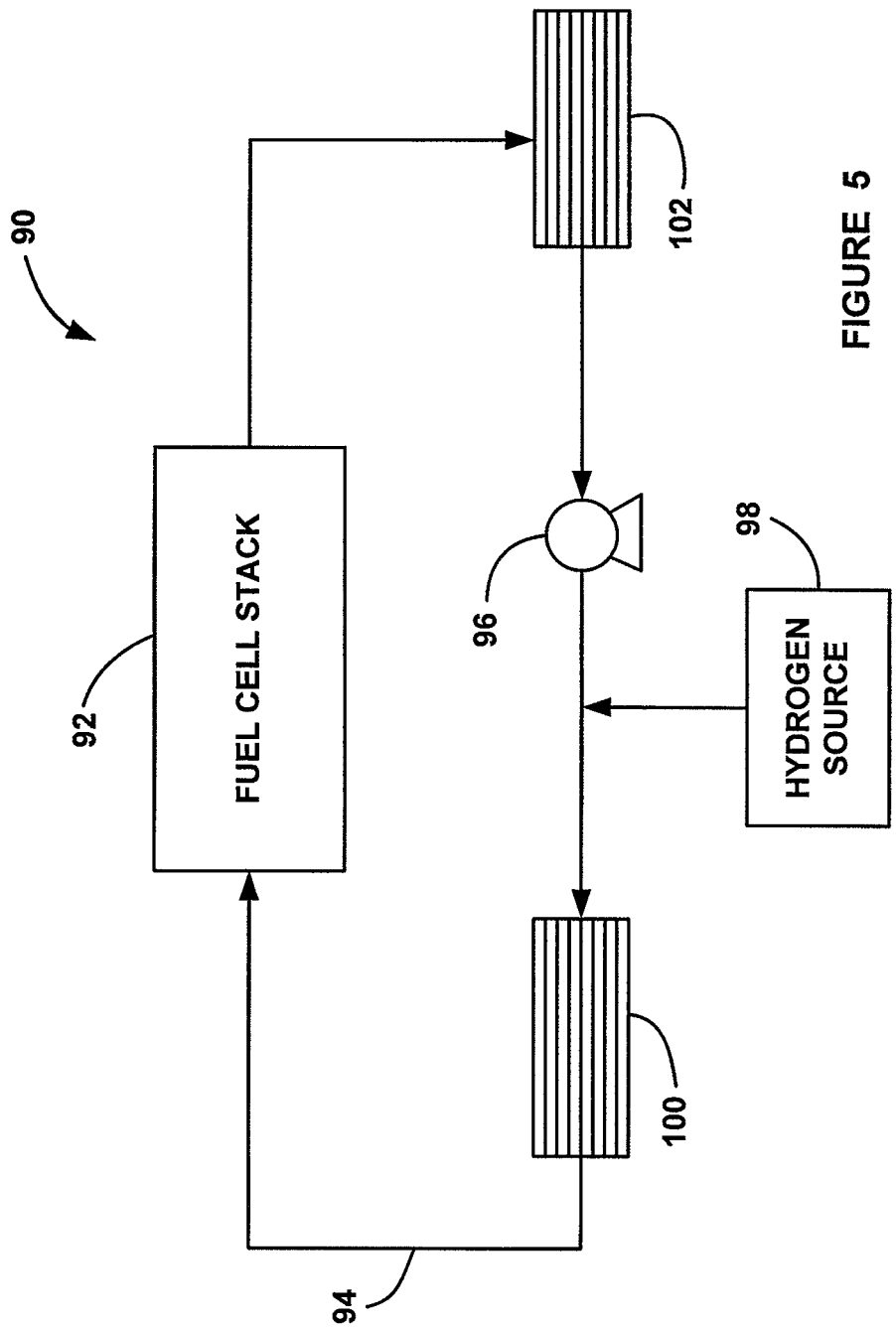
FIG. 5 is a schematic plan view of a fuel cell system employing an anode recycle pump and water trap humidifiers for humidifying recirculated anode exhaust gas applied to the anode input.

FIG. 5 is a schematic plan view of fuel cell system 90 including a fuel cell stack 92. The fuel cell system 10 employs anode exhaust gas recycling where the anode exhaust gas emitted from the fuel cell stack 92 is pumped back through an anode exhaust recirculation loop 94 to the anode inlet of the fuel cell stack 92 by a recirculation pump 96. A hydrogen source 98 provides fresh hydrogen to the recirculation loop 94 depending on the current load of the stack 92 in a suitable mixing device (not shown), as would be well understood to those skilled in the art.

As discussed above, there are certain system operating conditions where the relative humidity of the anode exhaust gas is high, typically over 100%, and certain operation conditions where the anode exhaust gas relative humidity is low, such as during power transients, ambient air pressure changes, stack coolant temperature control variations, cold system starts, etc. It is typically desirable to remove the water droplets in the anode exhaust gas prior to it being recirculated back to the anode inlet because of various reasons, such as water may block the anode flow channels within the stack 92 and water in the recirculation system may cause problems during freeze conditions. However, a certain amount of relative humidity is desirable for the anode inlet gas to help maintain membrane humidity for proper fuel cell stack operation.

According to this embodiment of the invention, a wick-based watertrap humidifier, such as the humidifiers 44 and 46 discussed above, can be used to absorb water in the anode recirculation gas during those times when the relative humidity of the anode exhaust gas is high, and use that water in the water trap humidifier to humidify the recirculation gas during those times when the relative humidity of the anode recirculation gas is low.

The fuel cell system 90 includes two water trap humidifiers 100 and 102 in the anode exhaust gas recirculation loop 94. The present invention proposes using one of these devices in the recirculation loop 94 for the purposes discussed herein, depending on a particular application. For example, it may be desirable to use the water trap humidifier 100 downstream of the recirculation pump 96 so that the fresh, and usually dry, hydrogen from the hydrogen source 98 is humidified by the water trap humidifier 100. However, in this design, the wet anode recirculation gas goes through the recirculation pump 96, which could cause problems in the operation of the pump 96. Therefore, in some designs it may be desirable to put the water trap humidifier 102 upstream of the recirculation pump 96. Alternately, the water trap humidifier can be positioned within an anode exhaust gas manifold of the stack 92.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a first sub-stack including an anode input and an anode output;
   a second sub-stack including an anode input and an anode output;
   a plurality of control valves that control the flow of an anode reactant gas to the anode side of the first and second sub-stacks in a stack order switching manner; and
   a first humidifier positioned at the anode input of the first sub-stack that includes a plurality of corrugated walls separated by plates and a second humidifier positioned at the anode input of the second sub-stack that includes a plurality of corrugated walls separated by plates, wherein the walls and the plates of the first and second humidifiers absorb water, and wherein liquid water in the anode reactant gas that is output from the anode output of the first sub-stack and input into the anode input of the second sub-stack is absorbed by the second humidifier, liquid water in the anode reactant gas that is output from the anode output of the second sub-stack and input to the anode input of the first sub-stack is absorbed by the first humidifier, fresh hydrogen being provided to the anode input of the first sub-stack is humidified by the first humidifier and fresh hydrogen being provided to the second sub-stack is humidified by the second humidifier, wherein the first humidifier is positioned within an anode inlet manifold of the first sub-stack and the second humidifier is positioned within an anode inlet manifold of the second sub-stack.

2. The system according to claim 1 wherein the first and second humidifiers are wick-based water trap humidifiers.

3. The system according to claim 2 wherein the first and second humidifiers include corrugated walls that absorb liquid water where the anode reactant gas flows between the walls.

4. The system according to claim 2 wherein the first and second humidifiers are circular humidifiers including annular flow channels.

5. The system according to claim 1 wherein the first humidifier is positioned outside of the first sub-stack and the second humidifier is positioned outside of the second sub-stack.

6. The system according to claim 1 wherein the first humidifier is positioned in a non-active region of the first sub-stack adjacent to a cooling fluid flow and the second humidifier is positioned within a non-active region of the second sub-stack adjacent to a cooling fluid flow.

7. The system according to claim 1 wherein the plurality of valves include a first bleed valve at the output of the first sub-stack and a second bleed valve at the output of the second sub-stack, wherein the first bleed valve is closed and the second bleed valve is opened when fresh hydrogen is being provided to the first sub-stack and the first bleed valve is opened and the second bleed valve is closed when fresh hydrogen is being provided to the second sub-stack.

8. The system according to claim 1 wherein the plurality of valves include cross-over valves positioned between the first and second sub-stacks.

9. The system according to claim 8 wherein the cross-over valves are passive check valves.

10. The system according to claim 1 wherein the system is on a vehicle.

11. A fuel cell system comprising:
    a first sub-stack including an anode input and an anode output;
    a second sub-stack including an anode input and an anode output;
    a first cross-over line connecting the anode output of the first sub-stack and the anode input of the second sub-stack;
    a second cross-over line connecting the anode output of the second sub-stack and the anode input of the first sub-stack;
    a first input valve controlling a flow of fresh hydrogen to the anode input of the first sub-stack;
    a second input valve controlling a flow of fresh hydrogen to the anode input of the second sub-stack;
    a first cross-over valve positioned in the first cross-over line;
    a second cross-over valve positioned in the second cross-over line;
    a first bleed valve coupled to the anode output of the first sub-stack;
    a second bleed valve coupled to the anode output of the second sub-stack;
    a first humidifier positioned at the anode input of the first sub-stack that includes a plurality of corrugated walls separated by plates, wherein the corrugated walls and the plates absorb water; and
    a second humidifier positioned at the anode input of the second sub-stack that includes a plurality of corrugated walls separated by plates, wherein the corrugated walls and the plates absorb water, and wherein the first and second input valves, the first and second cross-over valves and the first and second bleed valves are controlled to provide stack order switching between the first and second sub-stacks, and wherein the first humidifier provides humidification for the fresh hydrogen being applied to the first sub-stack and absorbs water when fresh hydrogen is being provided to the second sub-stack and the second humidifier provides humidification for the fresh hydrogen being applied to the second sub-stack and directly absorbs water when the fresh hydrogen is being applied to the first sub-stack, wherein the first and second humidifiers are circular humidifiers including annular flow channels.

12. The system according to claim 11 wherein the first and second humidifiers are wick-based water trap humidifiers.

13. The system according to claim 12 wherein the first and second humidifiers include corrugated walls that absorb liquid water where the anode reactant gas flows between the walls.

14. The system according to claim 11 wherein the first humidifier is positioned outside of the first sub-stack and the second humidifier is positioned outside of the second sub-stack.

15. The system according to claim 11 wherein the first humidifier is positioned within an anode inlet manifold of the first sub-stack and the second humidifier is positioned within an anode inlet manifold of the second sub-stack.

16. The system according to claim 11 wherein the first humidifier is positioned in a non-active region of the first sub-stack adjacent to a cooling fluid flow and the second humidifier is positioned within a non-active region of the second sub-stack adjacent to a cooling fluid flow.

17. A fuel cell system comprising:
a first stack including a reactant gas input and a reactant gas output;
a second stack including a reactant gas input and a reactant gas output;
a plurality of control valves that control the flow of a reactant gas to the reactant gas inputs and outputs of the first and second sub-stacks; and
a first humidifier positioned at the reactant gas input of the first stack that includes a plurality of corrugated walls separated by plates and a second humidifier positioned at the reactant gas input of the second stack that includes a plurality of corrugated walls separated by plates, wherein the corrugated walls and the plates absorb water, and wherein liquid water in the reactant gas output from one of the stacks is absorbed by one of the humidifiers, and fresh hydrogen being provided to one of the stacks is humidified by one of the humidifiers, wherein the first humidifier is positioned within an inlet manifold of the first sub-stack and the second humidifier is positioned within an inlet manifold of the second sub-stack.

18. The system according to claim 17 wherein the first and second humidifiers are wick-based water trap humidifiers.

19. The system according to claim 18 wherein the first and second humidifiers include corrugated walls that absorb liquid water where the reactant gas flows between the walls.

20. The system according to claim 18 wherein the first and second humidifiers are circular humidifiers including annular flow channels.

21. The system according to claim 17 wherein the first humidifier is positioned outside of the first sub-stack and the second humidifier is positioned outside of the second sub-stack.

22. The system according to claim 17 wherein the first humidifier is positioned in a non-active region of the first sub-stack adjacent to a cooling fluid flow and the second humidifier is positioned within a non-active region of the second sub-stack adjacent to a cooling fluid flow.

23. The system according to claim 17 wherein the reactant gas is hydrogen and the reactant gas inputs are anode inputs.

24. The system according to claim 17 wherein the reactant gas is air and the reactant gas inputs are cathode inputs.

25. A fuel cell system comprising:
a fuel cell stack including an anode input and an anode output;
an anode recirculation loop for recirculating anode exhaust gas from the anode output back to the anode input;
a recirculation pump positioned in the recirculation loop for pumping the anode exhaust gas to the anode input; and
a water trap humidifier that includes a plurality of corrugated walls separated by plates that is positioned in the anode recirculation loop and the corrugated walls and the plates act to absorb water vapor from the anode recirculation gas when the wetness in the recirculation gas is high and acting to discharge water vapor to the anode recirculation gas when the wetness of the anode recirculation gas is low.

26. The system according to claim 25 wherein the water trap humidifier is positioned upstream from the recirculation pump.

27. The system according to claim 25 wherein the water trap humidifier is positioned downstream from the recirculation pump.

28. The system according to claim 25 wherein the water trap humidifier is positioned downstream from a location where fresh hydrogen is introduced into the anode recirculation loop.

29. The system according to claim 25 wherein the water trap humidifier is positioned within an anode exhaust gas manifold.

30. The system according to claim 25 wherein the water trap humidifier is a wick-based water trap humidifiers.

31. The system according to claim 30 wherein the water trap humidifier includes corrugated walls that absorb liquid water where the anode reactant gas flows between the walls.

32. The system according to claim 30 wherein the water trap humidifier is a circular humidifier including annular flow channels.

* * * * *